Feb. 5, 1924.
C. STRAND
EXPANDING RING CLUTCH
Filed Jan. 27, 1922
1,482,715
2 Sheets-Sheet 2
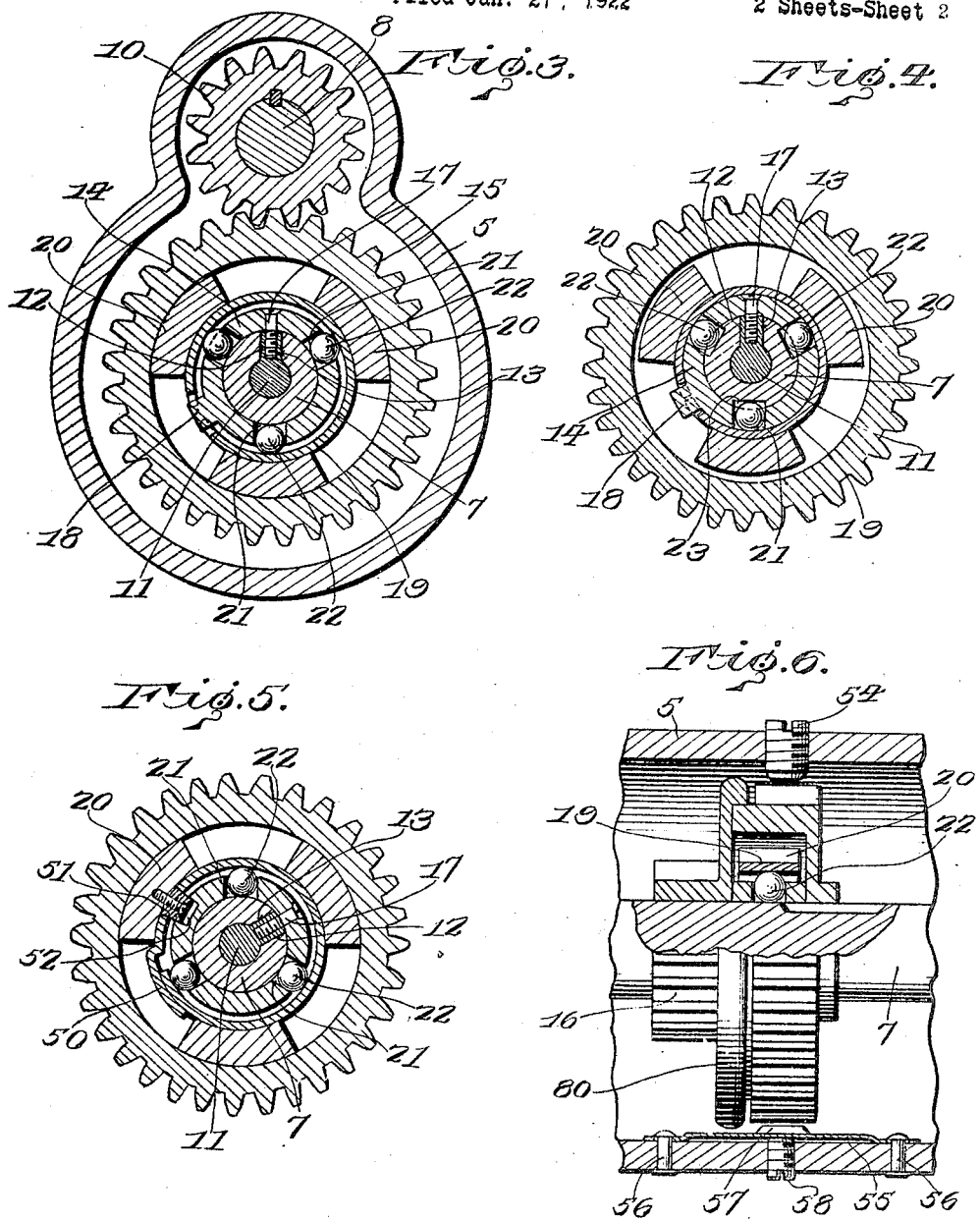
Inventor
Clarence Strand
By Horace E. ?
Attorney Patented Feb. 5, 1924.

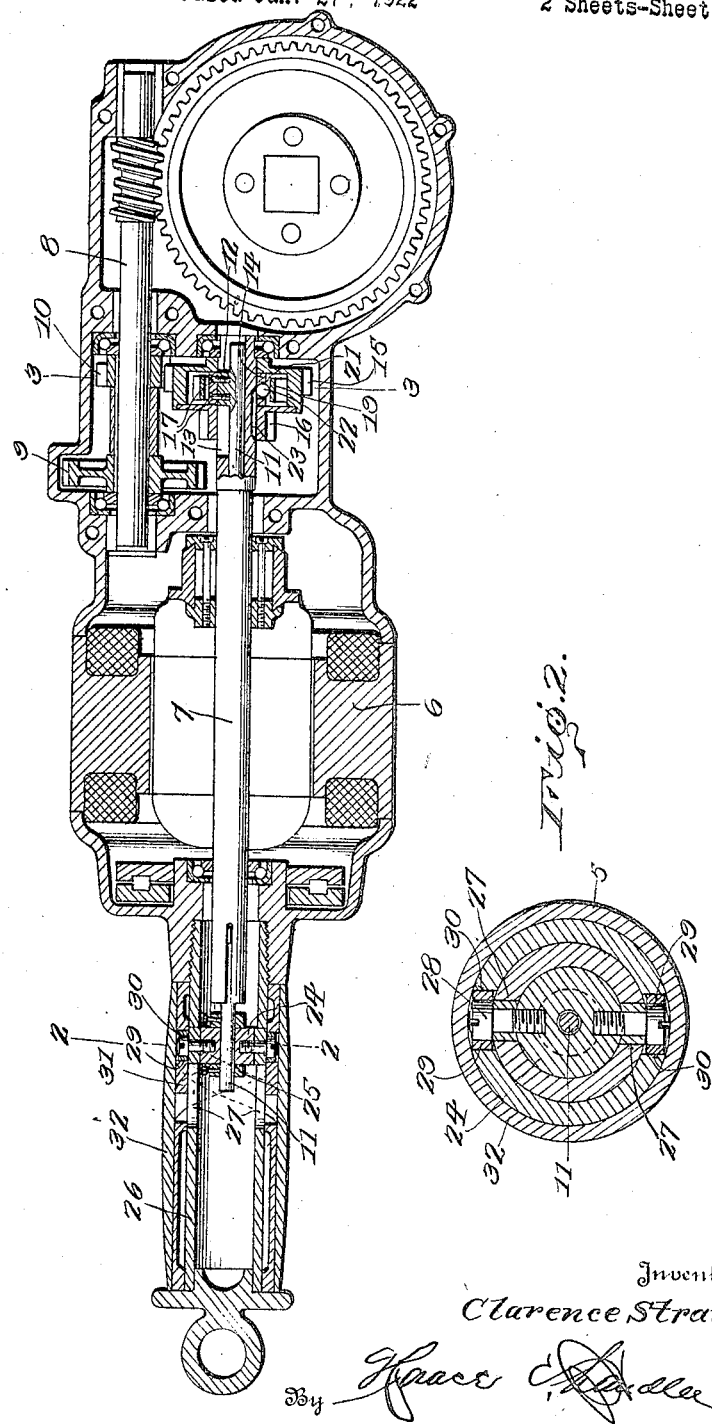

1,482,715

UNITED STATES PATENT OFFICE.

CLARENCE STRAND, OF MAHNOMEN, MINNESOTA.

EXPANDING RING CLUTCH.

Application filed January 27, 1922. Serial No. 532,217.

*To all whom it may concern:*

Be it known that I, CLARENCE STRAND, a citizen of the United States, residing at Mahnomen, in the county of Mahnomen, State of Minnesota, have invented certain new and useful Improvements in Expanding Ring Clutches; and I do hereby declare the following to be a full, clear, and exact description of the invention, such as will enable others skilled in the art to which it appertains to make and use the same.

This invention relates to gear shift and clutch mechanism, but particularly, though not exclusively, adapted for use in connection with hand operated assembling tools, such as that disclosed in my Patent No. 1,384,811, dated July 19, 1921.

The primary object of the invention is to provide gear shift and clutch mechanism which is wholly enclosed within the body of the tool and therefore preventing tampering with the parts thereof; which is mounted and operated in such a way as to be positive in action and to assure proper meshing of gears before power connection is established with the drive shaft; which is designed and mounted in such a way as to relieve objectionable end thrusts; which obviates the use of overhanging clutch operating forks and other such objectionable elements; which has its parts so constructed and operated as to minimize the opportunity for wear, breakage, or derangement, and which may be very accurately controlled by the tool operator.

With these objects in view, together with others which will appear as the description proceeds, the invention resides in the novel construction, combination and arrangement of parts, all as will be described more fully hereinafter, illustrated in the drawing and particularly pointed out in the claims.

In the drawing:

Figure 1 is a longitudinal sectional view, taken through an assembling tool of preferred design and illustrating as applied thereto gear shift and clutch mechanism embodying the invention, Figure 2 is a transverse sectional view, taken upon the line 2—2 of Figure 1, Figure 3 is a similar view taken upon line 3—3 of Figure 1, and Figure 4 is a view similar to Figure 3, and indicating the parts in the position they will assume when the clutch mechanism is in released position.

Figure 5 is a transverse sectional view through the clutch collar mechanism and illustrating the use of a slightly modified form of expansible clutch ring, and Figure 6 is a fragmentary sectional view illustrating a modification embodying brake clutch mechanism.

Referring now more particularly to the drawing, 5 indicates the casing of the tool, the same containing a motor indicated at 6, the motor shaft thereof being indicated at 7. Contained within the casing is a driven or jack shaft 8 disposed parallel to drive shaft 7 and having secured thereto in spaced relation large and small speed gears 9 and 10. The jack shaft 8 may be connected as by the worm and worm gear shown with the element to be driven.

The drive shaft 7 of the motor, in the present instance, is hollow, and slidably receives a shaft or pin 11. This pin 11, at its inner end, is provided with a key 12 slidably engaged in a slot 13 in the adjacent end of the hollow shaft 7, this pin and slot connection affording a positive driving connection between the shaft and pin, yet permitting the pin to slide longitudinally within the said shaft.

The said inner end of drive shaft 7 has slidably mounted thereon a clutch collar 14, the latter being arranged in an annular recess formed in a relatively large gear 15, carried by the shaft 7; the gear 15 being adapted to engage and mesh with the smaller gear 10 of the jack shaft. Permanently secured to gear 15 is a smaller gear member 16, adapted when in retracted position to mesh with the teeth of the larger gear 9 of the said jack shaft. The gears 15—16 may be formed in one piece, with the larger of said gears hollowed out to receive the clutch collar 14 and the other mechanism to be hereafter detailed or the said gears may be made separately and afterwards permanently joined together so as to move and operate as a unit upon shaft 7. The collar 14 is permanently secured to the key 12 of the pin 11 by retaining screws 17, so that the said collar will travel with pin 11. The sleeve is equipped with an outwardly or radially projecting stud 18 which is arranged in an opening or recess in an annular spring clutch member 19 disposed within the channel or recess in gear 15. The clutch member or spring 19 is an open ring, and is provided with a number (preferably 3) of outwardly projecting clutch heads or shoes 20, adapted when the ring is expanded, to engage and lock with the inner surface of the recessed gear member 15. As will be observed, the clutch heads or faces 20 are disposed at equal distances around the circumference of the clutch member, 120° apart. By connecting the clutch member 19 with the sleeve or collar 14, by means of the pin and socket, it is apparent that the clutch spring will be held properly in position within the channelled gear, and will travel properly with the clutch collar.

The clutch collar 14 is provided at regular intervals around its circumference with openings or recesses 21, adapted to loosely accommodate clutch balls or rollers 22. The recesses 21 pass entirely through the clutch collar 14 and are spaced apart around the circumference of the said collar 120° and in positions in line with the said clutch heads 20.

The hollow shaft 7 of the motor is provided at points preferably equidistant between the gears 9 and 10 of the jack shaft with longitudinally disposed recesses or channels 23; the said channels being so positioned as to lie directly beneath the openings in the clutch collar, there being one of said channels for each of said openings. It will be noted that the channels 23 slope outwardly at their extremities so that as the gear moves longitudinally of the said shaft, the balls or rollers 22 will be caused to move inwardly or outwardly of the clutch collar, depending upon the position of the speed gear, relative to the channels 23 in the shaft.

The inner end of the pin or shaft 11 extends beyond the adjacent end of the motor shaft 7 and is mounted in a head 24 locked upon the pin by set collars 25. This head is adapted to travel within a reduced neck or handle portion 26 of the tool casing, and, at diametrically opposite points, portions of said head extend through slots 27 disposed longitudinally within the portion 26. Mounted in these extending portions of the head 24 are screws or studs 28. These studs have rotatably mounted upon their outer ends rollers 29 engaged within helical channels 30 upon the interior of a sleeve 31 enclosing the handle portion 26. The sleeve 31 is enclosed by and connected with a rotatable hand grip 32 suitably arranged upon the handle portion of the tool.

In operation, when it is desired to shift the gears 15—16 with respect to the gears 9 and 10 of the jack shaft, it is but necessary to rotate the hand grip 32. The direction of rotation of this grip will, of course, depend upon which of the gears it is desired to connect. It will be understood, of course, that in rotating the hand grip 32, the sleeve 31 correspondingly moves, and the studs 28, carrying with them the head 24, will be forced in one direction or another by reason of the helical slots or channels upon the interior of the sleeve 31. This movement of the head 24 will cause the pin 11 to correspondingly travel, whereupon the double gear 15—16 at the inner end of the drive shaft is caused to slide longitudinally of the said shaft. In Figure 1 of the drawing, the lever gear 15 is shown in driving connection with the smaller gear 10 of the jack shaft and the clutch operating balls 22 are at the limit of their outward radial movement and engage with the clutch ring or spring 19. The pressure of these balls with the said spring forces the clutch shoes 20 into engagement with the gear 15, thus locking the said gear with the hollow drive shaft 7. When it is desired to break this power connection, the hand grip 32 is rotated so as to retract pin 11. The first movement of the said pin causes the unit gears to be retracted so that the balls 22 may enter the elongated channels 23 in the shaft 7, thus breaking the clutch connection between the shaft and the unit gear. Further retraction of the unit gear will cause gear face 16 to mesh with the larger gear 9 of the jack shaft, this intermeshing engagement being brought about just prior to the balls 22 reaching the extreme inner end of channel or recess 23 in shaft 7. As soon as the balls ride up the inclined inner ends of the said channels, they are forced into engagement with the clutch spring 19 and the latter has its shoes forced into contact with the inner face of large gear 15.

By arranging the device so that the clutch operating balls engage the ring or spring 16 between the several clutch shoes 20, it is obvious that the clutching action is made gradual as a certain well-defined degree of slippage is permitted. This obviates the possibility of violent thrusts or strains upon the gears and overcomes the possibility of breakage of the mechanism.

In Figure 5, of the drawing, there is shown a slightly modified form of clutch mechanism, wherein the ring or band 19 is made with its ends overlapping, as indicated at 50. These overlapped ends of the ring lie over one of the openings in which the balls 22 travel, and it is obvious that when the said balls move outwardly and press against the band, an even expansion of the latter throughout its circumference is accomplished, and in consequence the brake shoes carried by the band will bear with equal pressure against gear 15. The band is provided with an inwardly projecting lug or stud 51, engaged in a recess 52, in the outer surface of the clutch collar, and it is apparent from this construction, that while permitting expansion and contraction of the band, the band will be prevented from moving circumferentially or laterally of the clutch collar.

The size, thickness and degree of resiliency of this band, will, of course, be governed by the degree of resiliency required for the particular tool to which the same is applied.

In order to retard the rotation of the gears 15—16, when released from the shaft 7, so that they may be engaged with the gears of the jack shaft, there is illustrated in Figure 6, a modification showing a brake mechanism including a screw 54, made of fibre or similar material, mounted in the casing 5 and in the path of a flange 80 formed upon the gear 16. This screw may be adjusted so as to engage the flange 80 to a sufficient degree. Opposite the screw 54, is a second braking device, formed of a flat spring 55 attached to the casing as shown at 56, and provided with a suitable pad 57, which will engage the flange 80 in the same manner as the screw 54. Adjustment of this pad, toward and away from the flange, is accomplished by means of an adjusting screw 58, having bearing upon the spring in the rear of the pad.

A further purpose of this brake device is to lock the clutch gears as soon as the clutch is released, so that the operator can, when doing delicate work, stop the rotation of the worm gear instantly, otherwise the revolving speed of the clutch gear and friction of the rotating motor shaft, would cause the worm gear to rotate a short time after the clutch was released.

The foregoing is a description of the invention in its preferred form. However, it is apparent that the variations in the construction and arrangement of parts may be resorted to if desired, without departing from the invention as defined by the claims.

What is claimed is:

1. In a device of the class described, a drive shaft, a driven shaft, fixed gears on one of said shafts, gears slidably carried by the other of said shafts, a pin slidable longitudinally of the said other shaft, a connection between said pin and said slidable gear, and means operating automatically upon the slidable gear reaching the limit of its movement in either direction for establishing a driving connection between said gear and said shaft.

2. In a device of the class described, a drive shaft, a gear slidable upon said shaft, means for sliding said gear, clutch mechanism interposed between said gear and said shaft, and means operating automatically upon the said gear reaching the limit of its sliding movement in either direction upon said shaft for operating said clutch mechanism to establish driving connection between said shaft and said gear.

3. In a device of the class described, a shaft, a gear slidable upon said shaft, a clutch member within said gear, rollers within said gear adapted to force said clutch mechanism into engagement with said gear, the said rollers carried by said shaft, the said shaft having recesses therein for the reception of said rollers and means for sliding said gear.

4. In a device of the class described, a hollow shaft, the said shaft having a longitudinal slot therein, a pin extending through said shaft, a key on said pin engaged in said slot, a collar enclosing said shaft and secured to said key, the said collar having an opening therein, a ball in said opening, the said shaft having a longitudinal recess underlying the path of movement of the opening in said collar, an expansible ring enclosing said collar and adapted to be engaged by said ball, a gear enclosing said ring and adapted to be engaged by said clutch member, and means for moving said pin.

5. In a device of the class described, a hollow shaft, the said shaft having a longitudinal slot in one end thereof, a pin slidable longitudinally within said shaft, a key on said pin engaged in said slot, a collar enclosing said shaft and secured to said key, a gear enclosing said collar, a clutch band interposed between said gear and said collar, clutch shoes carried by said band and adapted to be engaged with said gear, the said collar having openings therein between said shoes, balls arranged within said openings and adapted to engage said band, the said shaft having longitudinal recesses therein underlying the openings in said collar, and means for sliding said pin.

6. In a device of the class described, a hollow shaft, a pin slidable through said shaft, speed gearing and clutch mechanism controlled by the movements of said pin, a rotatable sleeve, the said sleeve having a helical clutch on the interior thereof, a head secured to said pin, studs radiating from said head, and rollers on the ends of said studs engaged in said helical recesses.

7. In a device of the class described, a drive shaft, a clutch collar carried by said shaft, a gear overlying said clutch collar and rotatable independably of the latter, a spring band enclosing said collar, the ends of said band overlapping, a movable member in said clutch collar capable of moving outwardly thereof and pressing against the overlapped ends of said band, a clutch shoe carried by said band and adapted to engage with said gear, means for maintaining said band against circumferential and lateral movement upon said clutch collar, and means for moving said movable member.

8. In a device of the class described, a rotatable drive shaft, a gear slidable upon said shaft, means for sliding said gear, clutch mechanism interposed between said gear and said shaft, means operating automatically upon the said gear reaching the limit of its sliding movement in either direction upon said shaft for operating said clutch mechanism to cause rotation of the gear with the shaft and means for retarding the rotation of the gear when the clutch mechanism is released.

In testimony whereof, I affix my signature, in the presence of two witnesses.

CLARENCE STRAND.

Witnesses:
E. G. ZABEL,
G. J. SUMA.